April 2, 1968 H. W. HINES ET AL 3,376,436

PRECISION DIGITAL DELAY CIRCUIT

Filed Aug. 13, 1965

*INVENTORS*
HERBERT W. HINES
ANDREW R. JOHNSON

BY John C Black

*ATTORNEY*

United States Patent Office 3,376,436
Patented Apr. 2, 1968

3,376,436
PRECISION DIGITAL DELAY CIRCUIT
Herbert W. Hines and Andrew R. Johnson, Endwell, N.Y., assignors to International Business Machines Corporation, Armonk, N.Y., a corporation of New York
Filed Aug. 13, 1965, Ser. No. 479,500
5 Claims. (Cl. 307—293)

ABSTRACT OF THE DISCLOSURE

The circuit includes a logical AND circuit having a pair of input terminals, one of which receives the input signal which is to be delayed. The input signal is also applied to a transistor switch which drives a transformer having a square loop hysteresis characteristic from saturation of one polarity to saturation of the opposite polarity. During switching of the transformer, the pulse produced in the output winding of the transformer inhibits an output from the AND circuit; and, at the end of the switching time, the signal in the output winding terminates to permit satisfaction of the AND function thereby producing an output pulse with the desired delay interval. The output pulse terminates coincident with the termination of the input signal at which time the transformer core is restored to its initial state.

The present application relates to an improved digital delay circuit.

In known circuits which delay bivalued signals for a predetermined time interval (approximately one microsecond and longer), the actual delay is usually dependent upon a resistor-capacitor or a resistor-inductor time constant. In addition, typical digital delay circuits are frequently dependent upon the parameters of transistors which are incorporated in the circuit.

The delays are therefore dependent upon the tolerances of the devices and upon the device characteristic variations caused by changes in the ambient temperature. As a result, when a particular circuit with specified design characteristics is mass-produced, the nominal variation in delay from circuit to circuit at a selected ambient temperature varies substantially; and these variations are further magnified by changes in temperature. This results in a variation in the width of the delayed pulse as well as a variation in the time during which the leading edge of the delayed pulse occurs.

Accordingly, it is a primary object of the present invention to provide an improved, reproducible digital delay circuit in which the signal delay is very precisely and accurately controlled and is uniform from circuit to circuit.

This object is achieved in the preferred embodiment of the present application by means including a logical AND circuit having a pair of input terminals, one of which receives the input signal which is to be delayed. The input signal is also applied to a transistor switch which drives the primary winding of a transformer having a magnetic core with a square loop hysteresis characteristic. The secondary winding of the transformer is connected to the other input of the AND circuit to inhibit an output pulse until the transformer core switches from saturation of one polarity to saturation of the opposite polarity. At the end of the switching time of the core, the function of the AND circuit is satisfied to produce an output pulse. When the input signal is removed, satisfaction of the AND function is disrupted to terminate the output pulse; and a bias winding in the transformer restores the core to its initial state.

The signal delay is dependent essentially upon the number of turns in the primary winding, the total change in flux and the supply voltage. The number of turns selected is constant. In a typical tape wound core, the maximum change in flux as the temperature is varied over a wide range (e.g., from −10° C. to +50° C.) is held to about two and four-tenths percent. With a controlled ambient environment, the change in flux can be held to very small values. By using a relatively high supply voltage, variations in delay due to supply variations can be maintained at very low values.

Accordingly, it is a more specific object of the present invention to provide a digital delay circuit which applies an input pulse directly to one input terminal of an AND circuit and which causes a transformer having a square loop hysteresis characteristic to apply a controlled inhibit pulse of selected time duration to the other input of an AND circuit for providing a more accurately controlled, delayed output pulse.

The features of the present delay circuit produce several advantages, i.e., the circuit is not dependent upon a resistor-capacitor or a resistor-inductor time constant; it has a low sensitivity to wide variations in ambient temperature; it is substantially independent of variations in the characteristics of the transistors utilized; it is relatively low cost and easily packaged; it has low overall variations in the circuit delay without substantial skew problems; and the variation in delay can be reduced by increasing the value of the supply voltage.

The foregoing and other objects, features and advantages of the invention will be apparent from the following more particular description of a preferred embodiment of the invention, as illustrated in the accompanying drawings.

Figure 1:
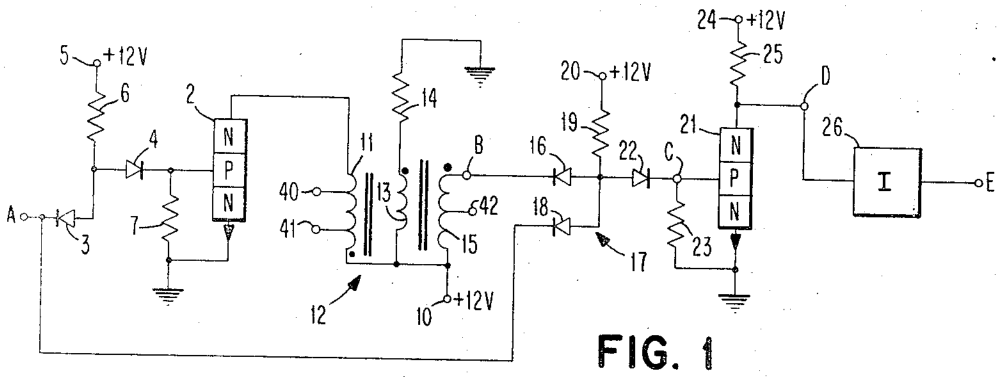
FIG. 1 is a schematic diagram of a preferred form of the improved delay circuit.

The delay circuit of FIG. 1 includes an input signal terminal A coupled to a common emitter transistor switch 2 by way of oppositely poled diodes 3 and 4. The junction between the diodes is connected to a positive supply terminal 5 by way of a bias resistor 6.

A base bias resistor 7 connects the base electrode of the transistor 2 to ground potential. The collector electrode of the transistor 2 is connected to a positive supply terminal 10 by way of the primary winding 11 of a transformer 12 having a square loop hysteresis characteristic such as that illustrated in FIG. 3.

Figure 3:
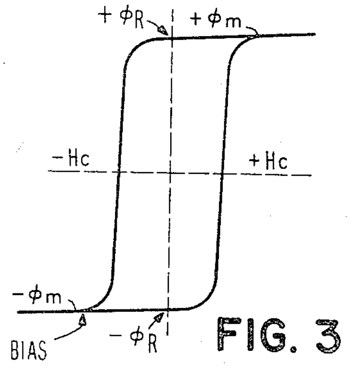
FIG. 3 illustrates the square loop hysteresis characteristic of a transformer suitable for use in the delay circuit of FIG. 1.

The transformer 12 includes a bias winding 13 which is connected to the supply terminal 10 and which is connected to ground potential by way of a current limiting resistor 14. Current through the resistor 14 and the winding biases the core at negative saturation, i.e. $-\phi_m$ (FIG. 3). The transformer also includes a secondary winding 15 having its upper end B connected to one diode 16 of an AND circuit 17. The AND circuit includes a second diode 18 connected to the input terminal A and a resistor 19 connecting a positive supply terminal 20 to the diodes 16 and 18.

The output of the AND circuit 17 is connected to the base electrode of a transistor inverter 21 by way of a diode 22 and a junction C. The base electrode of the inverter is connected to ground potential by way of a bias resistor 23. The emitter electrode of the inverter 21 is connected to ground potential and its collector electrode is connected to a positive supply terminal 24 by way of a resistor 25. The collector electrode is also connected to a second inverter 26 by way of a junction D.

The output of terminal E produces a signal which is non-inverted with respect to the input signal.

Figure 2:
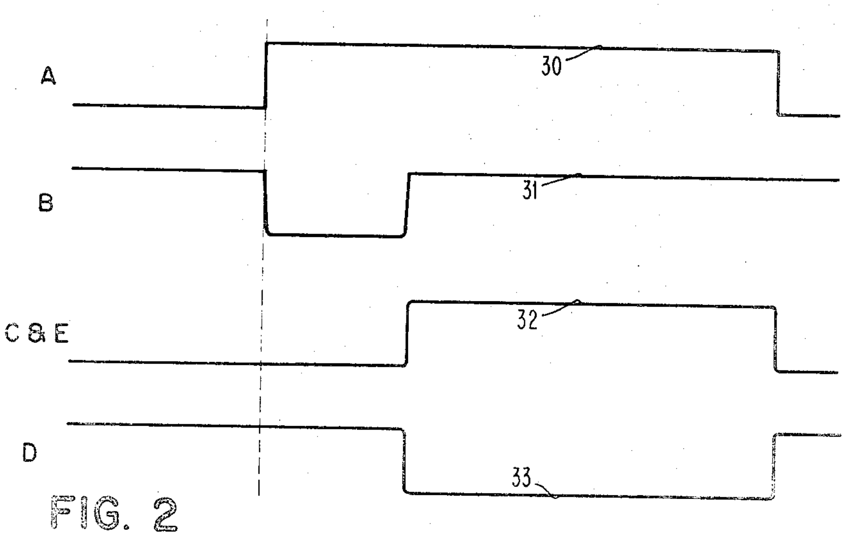
FIG. 2 shows input, output and certain intermediate waveforms to illustrate the operation of the circuit of FIG. 1.

The operation of the delay circuit of FIG. 1 will now be described, reference being directed to the waveforms 30–33 of FIG. 2 which appear at the junctions A–E.

When a positive-going input signal 30 appears at the junction A, it is applied to the diode 18 and to the diode 3. As soon as the input pulse reaches a very small positive level in the order of one-half volt, a sufficiently positive potential will be applied to the base electrode of the transistor 2 by way of the resistor 6 and the diode 4 to initiate turn on of the transistor.

As the transistor 2 turns on, current begins to flow through the primary winding 11 to drive the core from negative ($-\phi_m$) to positive ($+\phi_m$) saturation (FIG. 3). During the time period that the flux change is in the vertical portion of the hysteresis curve, a negative-going pulse 31 is produced at B and is applied to the diode 16 to maintain the inverter 21 turned off. The maximum negative level at B must be at ground potential or slightly negative. This can be effected by selecting a secondary to primary winding ratio of one or more.

The time required from the initiation of current flow in the transistor 2 to produce the maximum negative level at B in a typical transformer is in the order of fifty nanoseconds. The pulse 31 reaches its maximum negative value in this time interval even though the transistor 2 has not reached its full turn on state, this interval being substantially independent of the turn on characteristics of the transistor. With this delay being so short, no significant output transient is produced. When the flux in the core reaches the maximum positive value, the voltage at B rapidly rises to the level at the terminal 10 to reverse bias the diode 16.

With the diodes 16 and 18 reserve biased, the positive potential at the terminal 20 forward biases the diode 22 to produce a positive pulse 32 at junction C to turn on the inverter 21. When the inverter 21 turns on, the output voltage at the junction D drops to ground potential as illustrated by the waveform 33 (FIG. 2). The inverter 26 responds to this waveform to produce an inverted waveform at the output junction E similar to that illustrated by the waveform 32.

When the input waveform 30 returns to ground potential, it turn off the transistor 2 and forward biases the diode 18 to turn off the inverter 21. The output signal at the junction D returns to the positive level of the terminal 24 and the output voltage at the terminal E returns to ground potential, terminating the output pulse.

When the transistor 2 is turned off, the bias winding 13 returns the flux in the core to its maximum negative value, $-\phi_m$.

If the drive requirements of the output are low, the output can be taken from the junction C, i.e. the output of the logical AND circuit 17. An inverted output can be taken from the junction D.

The length of the input to output signal delay is essentially equal to the switching time of the square loop core and is defined as follows:

$$t = N\phi_t/E \qquad \text{(a)}$$

where:

$N$=number of turns in the primary winding
$\phi_t$=(the total flux change from $-\phi_m$ to $+\phi_m$)=$2\phi_m$
$E$=the transistor supply voltage (at terminal 10)

The variation, $\Delta t$, in the switching time is given by:

$$\Delta t = dt = \frac{\phi_t}{E}dN + \frac{N}{E}d\phi_t - \frac{N\phi_t}{E^2}dE$$

$$= \frac{\phi_t}{E}\Delta N + \frac{N}{E}\Delta\phi_t - \frac{N\phi_t}{E^2}\Delta E \qquad \text{(b)}$$

where:

$\Delta N$=variation of N
$\Delta\phi_t$=overall variation of $\phi_t$
$\Delta E$=overall variation of E In one tape wound core embodiment providing a two microsecond delay, $\phi_t = 240\times10^{-8}$ lines
$\Delta\phi_t = 2.4\%$ maximum (from $-10°$ C. to $+50°$ C.)
N=10 turns
$\Delta N = 0$
E=12 volts
$\Delta E = \pm 7\%$ Nominal switching time is computed as follows from Equation (a) above:

$$t = \frac{N\phi_t}{E}$$

$$= \frac{10\times240\times10^{-8}}{12}$$

$$= 2 \text{ microseconds}$$

The worst case, maximum variation in time over this wide ambient range is computed as follows from Equation (b) above:

$$\Delta t = \frac{N}{E}\Delta\phi_t - \frac{N\phi_t}{E^2}\Delta E$$

where both terms have the same sign, $$= \frac{10\times.024\times240\times10^{-8}}{12} + \frac{10\times240\times10^{-8}\times.07}{12\times12}$$

$$= .06 \text{ microseconds}$$

Taps such as 40 and 41 can be included in the primary winding 11. By connecting the collector electrode of the transistor 2 to different taps, the number of turns in the primary winding is changed; and different time delays can be selected. Reducing the number of turns in the primary winding does not necessarily require a change in the number of turns in the secondary since it will merely increase the negative pulse 31 at junction B. If desired, corresponding taps such as 42 can be provided in the secondary winding 15.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A digital delay circuit comprising
a logical AND circuit having a pair of input terminals and an output terminal;
one of the input terminals adapted for connection with a source of input pulses;
a high speed electronic switch having a conducting state and a substantially nonconducting state and including an output terminal and a control terminal;
means adapted for connection to the source and connected to the switch control terminal for operating the switch from one of its states to the other in response to each input pulse;
a transformer having primary, secondary and bias windings and having a core with a small coercive force and a substantially square loop hysteresis characteristic; and
first and second bias supply terminals;
the primary winding being connected between the first supply terminal and the switch output terminal, the bias winding being connected between the two supply terminals and effective to bias the core at one of its two maximum flux levels when the switch is nonconducting, the secondary winding being connected between the first supply terminal and the other input terminal of the AND circuit;
the transformer being responsive to the operation of the switch to said other state for switching the core from one maximum flux level to the opposite maximum flux level and for producing in the secondary winding a pulse which is applied to said other input terminal of the AND circuit only during the switching of the core to prevent an output pulse at the output terminal of the AND circuit, the input pulse, the first bias supply terminal and the secondary winding being effective upon the flux reaching the opposite maximum flux level for producing an output pulse at the output terminal of the AND circuit.

2. A digital delay circuit comprising a logical AND circuit having a pair of input terminals and an output terminal;

one of the input terminals adapted for connection with a source of input pulses;

a transistor switch having a conducting state and a substantially nonconducting state and including a collector electrode and a base electrode;

means adapted for connection to the source and connected to the base electrode for turning the switch on in response to each input pulse;

a transformer having primary, secondary and bias windings and having a core with a small coercive force and a substantially square loop hysteresis characteristic; and first and second bias supply terminals;

the primary winding being connected between the first supply terminal and the collector electrode, the bias winding being connected between the two supply terminals and effective to bias the core at one of its two maximum flux levels when the switch is nonconducting, the secondary winding being connected between the first supply terminal and the other input terminal of the AND circuit;

the transformer being responsive to the turning on of the switch for switching the core from one maximum flux level to the opposite maximum flux level and for producing in the secondary winding a pulse which is applied to said other input terminal of the AND circuit only during the switching of the core to prevent an output pulse at the ouput terminal of the AND circuit, the input pulse, the first bias supply terminal and the secondary winding being effective upon the flux reaching the opposite maximum flux level for producing an output pulse at the output terminal of the AND circuit.

3. A digital delay circuit comprising a logical AND circuit having a pair of input terminals and an output terminal;

one of the input terminals adapted for connected with a source of input pulses;

a common emitter transistor switch having a conducting state and a substantially nonconducting state and including a collector electrode and a base electrode;

means adapted for connection to the source and connected to the base electrode for turning the transistor on in response to each input pulse;

a transformer having primary, secondary and bias windings and having a core with a small coercive force and a substantially square loop hysteresis characteristic;

first and second bias supply terminals;

the primary winding being connected between the first supply terminal and the collector electrode, the bias winding being connected between the two supply terminals and effective to bias the core at one of its two maximum flux levels when the transistor switch is nonconducting, the secondary winding being connected between the first supply terminal and the other input terminal of the AND circuit;

the transformer being responsive to the turning on of the transistor switch for switching the core from one maximum flux level to the opposite maximum flux level and for producing in the secondary winding a pulse which is applied to said other input terminal of the AND circuit only during the switching of the core to prevent an output pulse at the output terminal of the AND circuit, the input pulse, the first bias supply terminal and the secondary winding being effective upon the flux reaching the opposite maximum flux level for producing an output pulse at the output terminal of the AND circuit; and at least one common emitter transistor amplifier responsive to each output pulse from the AND circuit for producing a signal, the leading edge of which occurs a predetermined time interval after the initiation of the respective input pulse from the source.

4. A digital delay circuit comprising a logical AND circuit having a pair of input terminals and an output terminal;

one of the input terminals adapted for connection with a source of input pulses;

a transistor switch having a conducting state and a substantially nonconducting state and including a collector electrode, an emitter electrode and a base electrode;

means adapted for connection to the source and connected to the base electrode for turning the transistor on in response to each input pulse;

a transformer having primary, secondary and bais windings and having a core with a small coercive force and a substantially square loop hysteresis characteristic; and first and second bias supply terminals;

the primary winding being connected directly between the first supply terminal and the collector electrode, the bias winding being connected between the two supply terminals and effective to bias the core at one of its two maximum flux levels when the transistor switch is nonconducting, the secondary winding being connected directly between the first supply terminal and the other input terminal of the AND circuit, and the emitter electrode being connected directly to the second supply terminal;

the transformer being responsive to the turning on of the transistor switch for switching the core from one maximum flux level to the opposite maximum flux level and for producing in the secondary winding a pulse which is applied to said other input terminal of the AND circuit only during the switching of the core to prevent an output pulse at the output terminal of the AND circuit, the input pulse, the first bias supply terminal and the secondary winding being effective upon the flux reaching the opposite maximum flux level for producing an output pulse at the output terminal of the AND circuit.

5. A digital delay circuit comprising a logical AND circuit having a pair of input terminals and an output terminal;

one of the input terminals adapted for connection with a source of input pulses;

a high speed electronic switch having a conducting state and a substantially nonconducting state and including an output terminal and a control terminal;

means adapted for connection to the source and connected to the switch control terminal for operating the switch from one of its states to the other in response to each input pulse;

a transformer having primary, secondary and bias windings and having a core with a small coercive force and a substantially square loop hysteresis characteristic; and first and second bias supply terminals;

the primary winding being connected between the first supply terminal and the switch output terminal, the bias winding being connected between the two supply terminals and effective to bias the core at one of its two maximum flux levels when the switch is non-conducting, the secondary winding being connected between the first supply terminal and the other input terminal of the AND circuit;

the transformer being responsive to the operation of the switch to said other state for switching the core from one maximum flux level to the opposite maximum flux level and for producing in the secondary winding a pulse which is applied to said other input terminal of the AND circuit only during the switching of the core to prevent an output pulse at the output terminal of the AND circuit, the input pulse, the first bias supply terminal and the secondary winding being effective upon the flux reaching the opposite maximum flux level for producing an output pulse at the output terminal of the AND circuit;

the logical AND circuit responsive to the termination of each input pulse for terminating its output pulse.

References Cited

UNITED STATES PATENTS

| | | | |
|---|---|---|---|
| 3,036,272 | 5/1962 | Le Vezu | 328—56 XR |
| 3,221,270 | 11/1965 | Tillman et al. | 307—88.5 XR |

ARTHUR GAUSS, *Primary Examiner.*

J. ZAZWORSKY, *Assistant Examiner.*